United States Patent
Oh (10) Patent No.: US 7,564,975 B2
(45) Date of Patent: Jul. 21, 2009

(54) METHOD OF CIPHERING DATA AND/OR VOICE CALL TO BE TRANSFERRED IN MOBILE COMMUNICATION SYSTEM AND METHOD OF DEACTIVATING THE CIPHERING

(75) Inventor: Myung Dae Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 754 days.

(21) Appl. No.: 10/669,472

(22) Filed: Sep. 25, 2003

(65) Prior Publication Data

US 2004/0096062 A1    May 20, 2004

(30) Foreign Application Priority Data

Nov. 19, 2002    (KR) ............... 10-2002-0072008

(51) Int. Cl.
*H04K 1/00* (2006.01)
(52) U.S. Cl. .............. 380/247; 455/410; 455/411; 455/435.1; 370/231; 370/242; 380/270
(58) Field of Classification Search .......... 380/270, 380/247; 709/227, 228; 455/410, 411, 435.1; 370/231, 242
See application file for complete search history.

(56) References Cited

U.S. PATENT DOCUMENTS

| | | | |
|---|---|---|---|
| 6,343,117 B1 * | 1/2002 | Bhagavath et al. | 379/93.02 |
| 6,363,150 B1 | 3/2002 | Bhagavath et al. | |
| 6,374,355 B1 | 4/2002 | Patel | |

FOREIGN PATENT DOCUMENTS

| | | | |
|---|---|---|---|
| CN | 1097533 A | 1/1995 | |
| DE | 198 12 215 A1 | 9/1999 | |
| EP | 0 617 528 A2 | 9/1994 | |
| EP | 0779760 | 6/1997 | |
| EP | 0 938 209 A2 | 8/1999 | |

(Continued)

OTHER PUBLICATIONS

Chinese Office Action dated Mar. 10, 2006 issued in a counterpart Chinese application.
Al-Tawil et al., "A New Authentication Protocol for GSM Networks", IEEE Comput. Soc., US; Oct. 11, 1998, pp. 21-30.
European Search Report dated Nov. 26, 2003.

(Continued)

*Primary Examiner*—Kimyen Vu
*Assistant Examiner*—April Y Shan
(74) *Attorney, Agent, or Firm*—Ked & Associates LLP (57) ABSTRACT

A system and method of controlling ciphering of call information between a mobile communication terminal and a network initiates the transmission of a ciphering request from the terminal to the network. The network then transmits a ciphering authentication request message to the terminal and the terminal responds by transmitting a ciphering authentication response message to the network. The network then transmits a ciphering activation completion message to the terminal in accordance with the ciphering authentication response message. A system and method for controlling deactivation of ciphering of call information initiates transmission of a ciphering deactivation request from the mobile terminal to the network. The network then performs the ciphering deactivation and transmits a ciphering deactivation completion message to the terminal. Through these systems and methods, the user terminal controls ciphering and deciphering of call information instead of the network.

6 Claims, 7 Drawing Sheets

FOREIGN PATENT DOCUMENTS

| | | |
|---|---|---|
| JP | 04-183133 | 6/1992 |
| JP | 06-284464 | 10/1994 |
| JP | 2000-031980 | 1/2000 |
| JP | 2002-217888 | 8/2002 |
| KR | 1020000058953 | 10/2000 |
| KR | 1002939440000 | 4/2001 |
| KR | 1020010064800 | 7/2001 |
| KR | 1020020020166 | 3/2002 |
| WO | WO 99/48318 | 9/1999 |
| WO | WO 01/76125 A2 | 10/2001 |
| WO | WO02/41602 | 5/2002 |
| WO | WO02/082781 | 10/2002 |

OTHER PUBLICATIONS

Korean Office Action dated Jan. 19, 2005.
Japanese Office Action dated Apr. 14, 2006.
Notice of Opposition dated Feb. 7, 2008.
Brief Communication dated Aug. 1, 2008.
Ciphering in GRPS and UMTS.
Integrated Transport Layer Security.
ETSI EN300 392-2 V2.3.2.
Japanese Office Action dated Nov. 27, 2008 (Translation).

* cited by examiner

Fig. 1

Prior Art

Prior Art

METHOD OF CIPHERING DATA AND/OR VOICE CALL TO BE TRANSFERRED IN MOBILE COMMUNICATION SYSTEM AND METHOD OF DEACTIVATING THE CIPHERING

BACKGROUND OF THE INVENTION

1. Field of the Invention

The present invention relates to ciphering data, and more particularly to a system and method for controlling the ciphering of voice, data, and/or other types of call information in a mobile communication system.

2. Background of the Related Art

In a GSM (General Systems for Mobile communication) mobile communication system, which performs 2-generation commercial services and a 2.5 generation GPRS (General Packet Radio Service) commercial services in the U.S.A or Europe, a user authentication process and a ciphering activation process are performed. These processes require registration procedures which allow the user of a mobile terminal to notify a network that the user will always use the terminal whenever the terminal is powered on. The registration procedures include an attach registration procedure, a location area update registration procedure, and a routing area update registration procedure.

In the course of performing registration procedures, the user authentication process and ciphering activation process are carried out when required by the network. More specifically, when a mobile communication terminal requests registration to the network, the network performs the user authentication process of confirming whether the terminal is an authenticated terminal. The ciphering activation process then determines whether data to be transferred between the terminal and network should be ciphered.

The user authentication and ciphering activation processes prevent wireless voice or data from being wiretapped or abused by a third party. Once the ciphering activation is set up between the mobile communication terminal and the network through the ciphering activation process, the call information is ciphered and then transferred therebetween.

Two methods may be used to determine whether ciphering should be carried out. In the first method, whether or not ciphering should be performed is determined in the course of registering the mobile communication terminal to the network after the terminal is powered on. In the second method, whether or not ciphering should be performed is determined when the mobile communication terminal wants to perform a specific service. The specific service includes a voice call for talking over the telephone, an SMS (Short Message Service) for transmitting a short message, an SS (Supplementary Service), a PDP (Packet Data Protocol) context activation service for transmitting a GPRS packet, etc.

Even when the data transfer procedures are not promised between the mobile communication terminal and the network (that is, even when the ciphering activation process is not carried out in registering the mobile communication terminal to the network and the data is transferred without ciphering), the ciphering activation process can be carried out by the network at the time of executing a service. In so doing, the data is ciphered and transferred from that time point.

Figure 1:
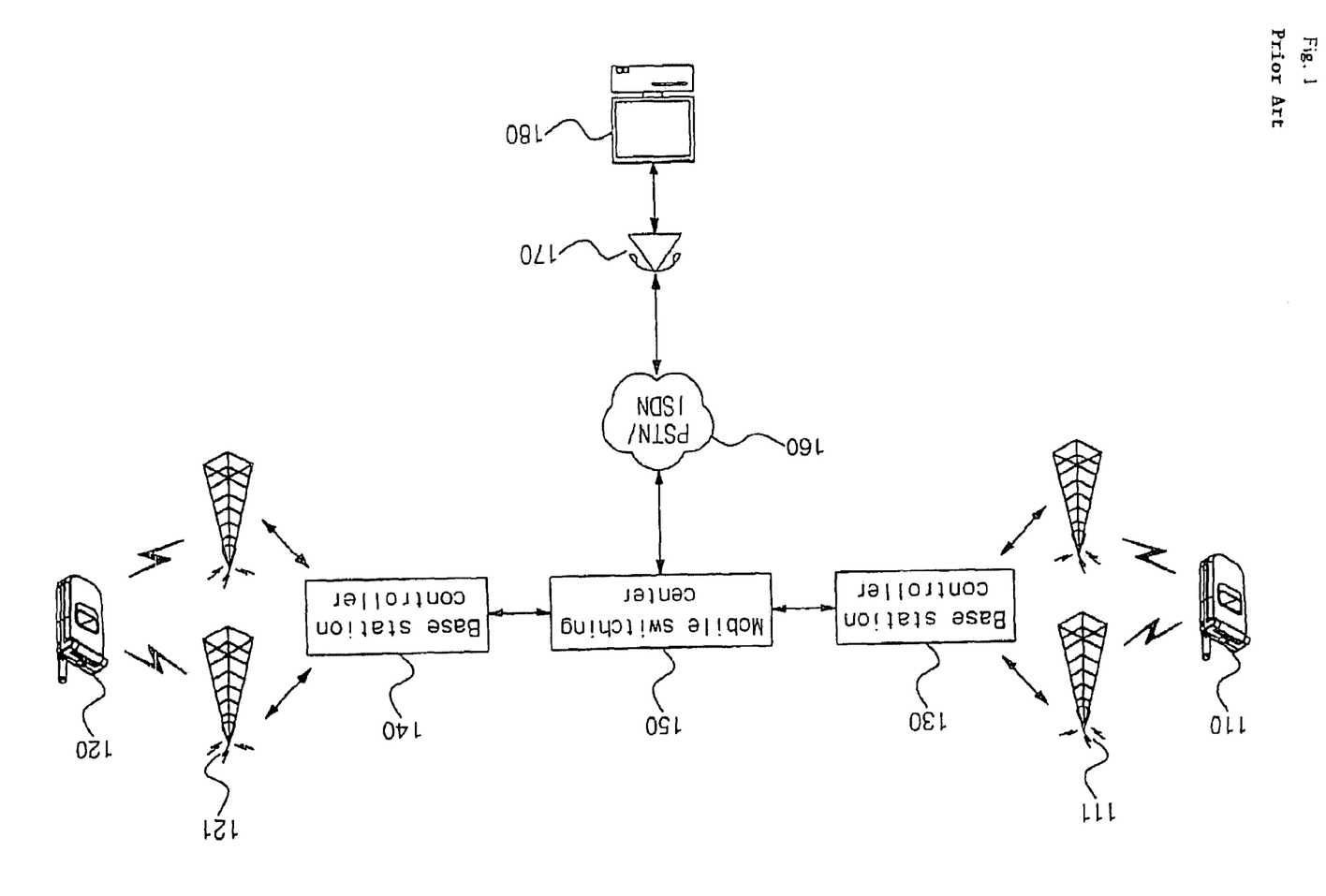
FIG. 1 is a schematic view showing a general configuration of a GSM mobile communication system.

FIG. 1 shows a general configuration of a mobile communication system which ciphers data transmitted using the GSM standard. This system comprises a mobile communication switching center 150 connected to a public switched telephone network (PSTN) and/or an integrated services digital network (ISDN) 160 for connection to a computer 180 through a general wire phone 170, or for direct connection to the computer, a plurality of base station controllers 130, 140 connected to the mobile communication switching center 150, a plurality of base stations 111, 121 respectively connected to the base station controllers 130, 140, and a plurality of mobile communication terminals 110, 120 respectively connected to the base stations 111, 121 through wireless links.

The base stations 111, 121 convert signal formats for wireless and wire links between the mobile communication terminals 110, 120 and the mobile communication switching center 150. The base stations also measure a transmitting/receiving electric field strength (signal intensity) of the terminals and transmit this information to the switching center 150.

The base station controllers 130, 140 serve as connection means between the respective functions by elements in the plurality of base stations 111, 121 and cell operators. The base station controllers also perform functions such as operational management of the base stations, management of service conditions of hardware and software in the base stations, assignment and construction of resources with respect to call traffic, establishment of information on operations of the base stations, operation and monitoring of the base stations, monitoring of sub-equipments associated with failure, etc.

The switching center 150 provides a line switching service to the base station controllers 130, 140 and the mobile communication terminals 110, 120, and performs a channel handoff as an additional function. In the mobile communication system described above, when any user transmits or receives a call using terminals 110, 120, the terminal is connected to a respective one of the base stations 111, 121.

Figure 2:
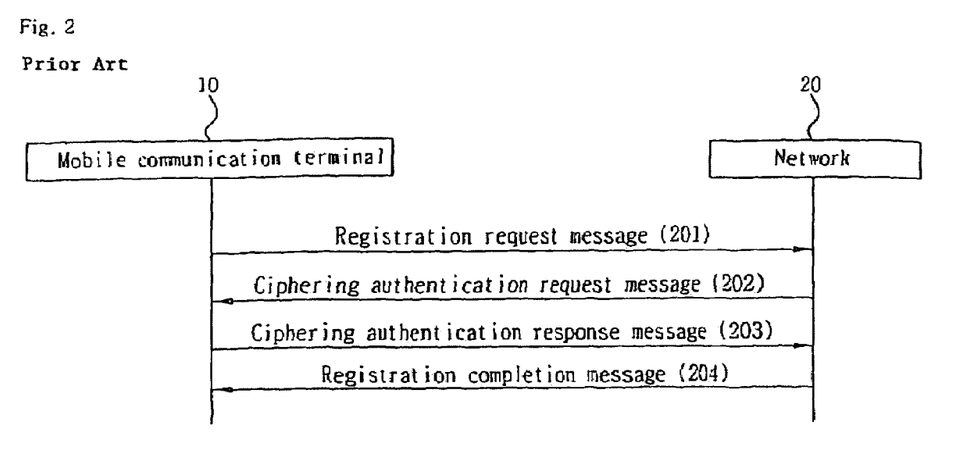
FIG. 2 is a flowchart of messages performed in a related-art ciphering activation process that may be implemented in the system of FIG. 1.

FIG. 2 shows a flow of messages between a mobile communication terminal and a network for a related-art ciphering activation process, which may be performed in the GSM mobile communication system shown in FIG. 1.

In GSM and GPRS commercial services provided in Europe, when a mobile communication terminal 10 is powered on, the terminal requests registration to a network 20. At that time, the terminal transmits a registration request message (Attach Request) 201 to a base station through a wireless link, and the base station transmits the registration request message 201 to a mobile communication switching center through a base station controller.

The network 20 receives the registration request message 201 from terminal and determines whether a ciphering activation process should be performed. When it is determined that the ciphering activation process should be performed, the network transmits a ciphering authentication request message 202 to the terminal 10. This terminal then transmits a ciphering authentication response message 203, suitable for the ciphering authentication request message 202 from the network, to the network.

When the network receives the ciphering authentication response message 203 from the terminal, the network transmits a registration completion message 204 indicative of completion of the registration procedure to the terminal, and thus the ciphering activation process between the terminal and network is finished.

When it is determined that the ciphering activation process should not be preformed by the network, the network does not transmit the ciphering authentication request message to terminal. Thus, data is transmitted between the terminal and network without being ciphered.

Figure 3:
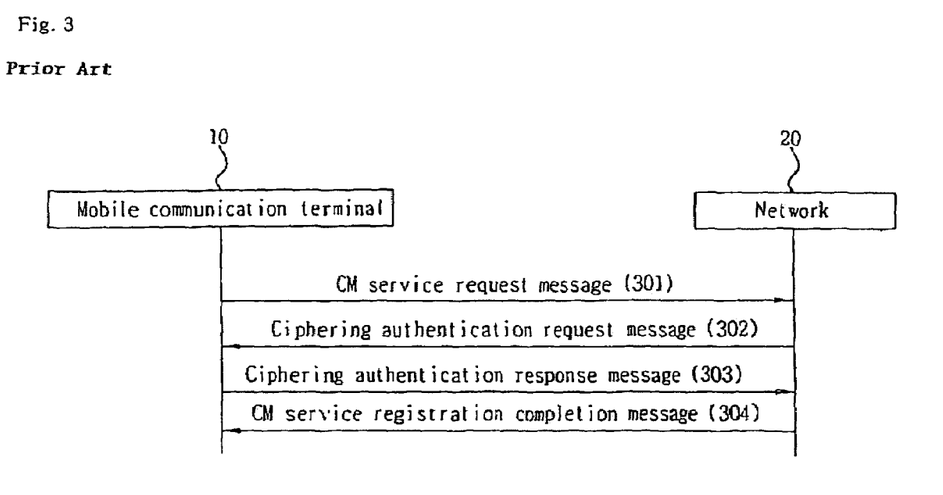
FIG. 3 is a flowchart of messages performed in a related-art procedure for activating a voice call which may take place in the system of FIG. 1.

FIG. 3 shows the flow of messages for ciphering a voice call in accordance with a related-art process, which may be performed in the GSM system shown in FIG. 1. When terminal 10 transmits a connection management (CM) service request message 301 to the network 20 in order to transmit a voice call, the network determines whether or not a ciphering activation process should be preformed in response to the CM service request message 301. When it is determined that the ciphering activation process should be performed, the network transmits a ciphering authentication request message 302 to the terminal.

The terminal transmits a ciphering authentication response message 303 suitable for the ciphering authentication request message 302 transmitted from the network 20, and thus the ciphering activation process between the terminal and network is finished.

When the network receives the ciphering authentication response message 303 from the terminal, the network transmits a CM service registration completion message 304 indicative of completion of the registration procedure to the terminal.

The related-art processes described above with reference to FIGS. 2 and 3 will be described again with reference to FIG. 4. When a GSM-type mobile communication terminal is powered on and is in a wait state 401, the terminal transmits a registration request message associated with data or a CM service request message associated with a voice call to a network. The network receives the message, 402, and determines whether a ciphering activation process should be performed or not, 403.

Figure 4:
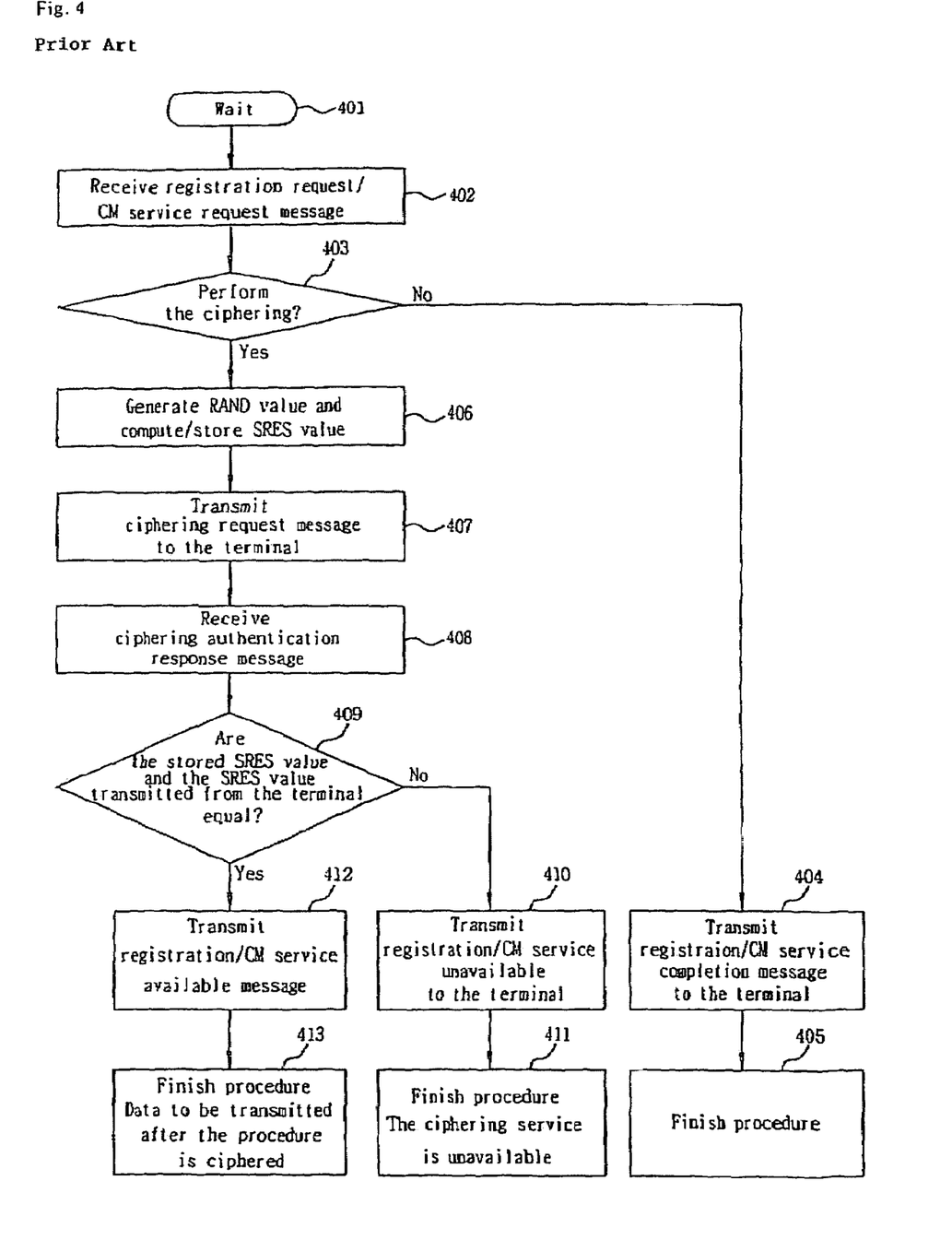
FIG. 4 is a flowchart showing steps performed in a related-art ciphering activation process.

When it is determined that the ciphering activation process should not be performed, the network transmits a registration/CM service completion message indicating that the ciphering activation process should not be performed to the mobile communication terminal, 404. Thus, the procedure is finished without performing the ciphering activation, 405. Then, all data to be transmitted after the procedure is transmitted without being ciphered.

When it is determined that the ciphering activation process should be performed, 403, the network generates a RAND (RANDom number) value to compute/store an SRES (Signed RESponse) value, 406. The network then transmits a ciphering authentication request message to the terminal, 407.

The terminal receives the ciphering authentication request message from the network and transmits a ciphering authentication response message to the network. Then, the network receives the ciphering authentication response message from the terminal, 408, and compares an SRES value transmitted from the terminal with the SRES value stored in the network to determine whether the two values are equal, 409.

When it is determined that the two values are not equal, 409, the network transmits a registration/CM service unavailable message indicating that the registration/CM service will not be used any more to the terminal, 410, and then the procedure is finished, 411. After the above procedure is finished, the transfer data cannot be subjected to the ciphering service.

When it is determined that the two values are equal, the network transmits a registration/CM service available message indicating that the registration/CM service will be used for the terminal 412, and then the procedure is finished, 413. After the above procedure is finished, the transfer data can be subjected to the ciphering service. All actions for the ciphering activation process are finished in the course of the voice call.

In the related-art methods described with reference to FIGS. 2-4, only the network determines whether the ciphering activation process should be performed or not. Therefore, when the ciphering activation process is not initially preformed or data is not specific data, there is a disadvantage in that the ciphering activation process cannot be performed even when a user wants to cipher and transmit and/or receive important data through the network. As a result, the user's important data is susceptible to being wiretapped or abused externally. Thus, since voice and data can be transmitted without being ciphered, there is a serious disadvantage that the user's important information can be revealed to a third party.

SUMMARY OF THE INVENTION

An object of the present invention is to solve one or more of the drawbacks of the related-art methods described above.

Another object of the present invention to provide a system and method which allows a mobile communication terminal to directly execute a ciphering activation process and a ciphering deactivation process of call information to be transferred between the terminal and a network in the mobile communication system.

In accordance with one embodiment of the present invention, a ciphering activation process is directly initiated and executed by the mobile communication terminal. However, the ciphering activation process between the mobile communication terminal and the network is not performed in an initial registration of the terminal to the network or in a starting point of a service. Instead, a user of the terminal who wants to cipher the voice call or data from a specific time point, requests execution of a predetermined ciphering activation process to the network. The network then performs one of two ciphering activation methods in response to the ciphering request at the specific time point transmitted from the mobile communication terminal.

In the first method, when the mobile communication terminal requests performance of the ciphering activation process, the network performs the ciphering activation process using a related-art method previously described.

In the second method, when the mobile communication terminal transmits a specific value at the same time the ciphering activation request is transmitted, the network computes a key value required for the ciphering activation process based on the specific value and then notifies the completion of the ciphering activation process. From that time, the mobile communication terminal and the network starts ciphering.

In addition, when a user has transmitted the data and thus does not want any more ciphering of data, the user terminal transmits a message indicating that the ciphering should stop to the network. The network then transmits a response to the message, and thus the ciphering process between the mobile communication terminal and the network is not performed any more.

A method of ciphering data to be transmitted between a mobile communication terminal and a network according to one embodiment of the present invention comprises: a step in which the mobile communication terminal makes a ciphering request of the data to the network; a step in which, when receiving the ciphering request message from the mobile communication terminal, the network transmits a ciphering authentication request message to the mobile communication terminal; a step in which the mobile communication terminal transmits a ciphering authentication response message to the network in response to the ciphering authentication request message; and a step in which the network transmits a ciphering activation completion message to the mobile communication terminal in accordance with the ciphering authentication response message transmitted from the mobile communication terminal. The ciphering authentication request message preferably includes a RAND value.

The ciphering request may be made by the mobile communication terminal even during transferring the data between the mobile communication terminal and the network.

The ciphering request may be made by the mobile communication terminal even when the data is not transferred between the mobile communication terminal and the network.

A method of ciphering a data to be transferred between a mobile communication terminal and a network according to another embodiment of the present invention comprises: a step in which the mobile communication terminal transmits a ciphering request message of the data including a specific value to the network; a step in which the network computes a key value required for a ciphering activation process on the basis of the specific value transmitted from the mobile communication terminal, and transmits a ciphering activation completion message indicative of completion of the ciphering activation process; and a step in which after the ciphering activation completion message is transmitted, the ciphering of the data to be transferred between the mobile communication terminal and the network. Here, the specific value uses an RAND value.

A method of ciphering a data to be transferred between a mobile communication terminal and a network according to another embodiment of the present invention comprises: a step in which the mobile communication terminal makes a ciphering request of the data to the network; a step in which the network receives the ciphering request message from the mobile communication terminal and determines whether an RAND value is included in the received ciphering request message or not; a step in which when it is determined that the RAND value is included in the received ciphering request message, the network generates a key value (Kc) required for the ciphering using the RAND value, and then transmits a ciphering activation completion message of the data to the mobile communication terminal; a step in which when it is determined that the RAND value is not included in the received ciphering request message, the network generates a RAND value, computes/stores an SRES value, and transmits a ciphering authentication request message to the mobile communication terminal, depending upon whether a ciphering activation should be performed or not; a step in which the mobile communication terminal transmits a ciphering authentication response message including the SRES value to the network, in response to the ciphering authentication request message transmitted from the network; and a step in which the network compares the SRES value transmitted from the mobile communication terminal with the SRES value stored in the network, and determines whether the ciphering of the data is available or not, depending upon whether the two values are equal to each other.

The ciphering authentication request message transmitted from the network to the mobile communication terminal includes the RAND value, and the ciphering authentication response message transmitted from the mobile communication terminal to the network includes the SRES value computed by the mobile communication terminal.

The present invention further comprises a step in which when it is determined that the received ciphering request message does not include the RAND value and the ciphering activation should not be performed, the network transmits a ciphering authentication unavailable message of the data to the mobile communication terminal.

Furthermore, a method of deactivating a ciphering of a data to be transferred between a mobile communication terminal and a network according to the present invention comprises: a step in which the mobile communication terminal makes a ciphering deactivation request of the data to the network; and a step in which the network performs the ciphering deactivation and transmits a ciphering deactivation completion message to the mobile communication terminal, in response to the ciphering deactivation request message transmitted from the mobile communication terminal.

The ciphering deactivation request may be made by the mobile communication terminal even during transferring the data between the mobile communication terminal and the network.

The ciphering deactivation request may be made by the mobile communication terminal even when the data is not transferred between the mobile communication terminal and the network.

A method of ciphering a voice call to be transmitted between a mobile communication terminal and a network according to another embodiment of the present invention comprises: a step in which the mobile communication terminal makes a ciphering request of the voice call to the network; a step in which, when receiving the ciphering request message from the mobile communication terminal, the network transmits a ciphering authentication request message to the mobile communication terminal; a step in which the mobile communication terminal transmits a ciphering authentication response message to the network in response to the ciphering authentication request message; and a step in which the network transmits a ciphering activation completion message to the mobile communication terminal in accordance with the ciphering authentication response message transmitted from the mobile communication terminal. The ciphering authentication request message preferably includes a RAND value.

The ciphering request may be made by the mobile communication terminal even during transferring the voice call between the mobile communication terminal and the network.

The ciphering request may be made by the mobile communication terminal even when the voice call is not transferred between the mobile communication terminal and the network.

A method of ciphering a voice call to be transferred between a mobile communication terminal and a network according to another embodiment of the present invention comprises: a step in which the mobile communication terminal transmits a ciphering request message of the voice call including a specific value to the network; a step in which the network computes a key value required for a ciphering activation process on the basis of the specific value transmitted from the mobile communication terminal, and transmits a ciphering activation completion message indicative of completion of the ciphering activation process; and a step in which after the ciphering activation completion message is transmitted, the ciphering of the voice call to be transferred between the mobile communication terminal and the network. Here, the specific value uses an RAND value.

A method of ciphering a voice call to be transferred between a mobile communication terminal and a network according to another embodiment of the present invention comprises: a step in which the mobile communication terminal makes a ciphering request of the voice call to the network; a step in which the network receives the ciphering request message from the mobile communication terminal and determines whether an RAND value is included in the received ciphering request message or not; a step in which when it is determined that the RAND value is included in the received ciphering request message, the network generates a key value (Kc) required for the ciphering using the RAND value, and then transmits a ciphering activation completion message of the voice call to the mobile communication terminal; a step in which when it is determined that the RAND value is not included in the received ciphering request message, the network generates a RAND value, computes/stores an SRES value, and transmits a ciphering authentication request message to the mobile communication terminal, depending upon whether a ciphering activation should be performed or not; a step in which the mobile communication terminal transmits a ciphering authentication response message including the SRES value to the network, in response to the ciphering authentication request message transmitted from the network; and a step in which the network compares the SRES value transmitted from the mobile communication terminal with the SRES value stored in the network, and determines whether the ciphering of the voice call is available or not, depending upon whether the two values are equal to each other.

The ciphering authentication request message transmitted from the network to the mobile communication terminal includes the RAND value, and the ciphering authentication response message transmitted from the mobile communication terminal to the network includes the SRES value computed by the mobile communication terminal.

The present invention further comprises a step in which when it is determined that the received ciphering request message does not include the RAND value and the ciphering activation should not be performed, the network transmits a ciphering authentication unavailable message of the voice call to the mobile communication terminal.

A method of deactivating a ciphering of a voice call to be transferred between a mobile communication terminal and a network according to another embodiment of the present invention comprises: a step in which the mobile communication terminal makes a ciphering deactivation request of the voice call to the network; and a step in which the network performs the ciphering deactivation and transmits a ciphering deactivation completion message to the mobile communication terminal, in response to the ciphering deactivation request message transmitted from the mobile communication terminal.

The ciphering deactivation request may be made by the mobile communication terminal even during transferring the voice call between the mobile communication terminal and the network.

The ciphering deactivation request may be made by the mobile communication terminal even when the voice call is not transferred between the mobile communication terminal and the network.

A method of ciphering a data and a voice call to be transmitted between a mobile communication terminal and a network according to another embodiment of the present invention comprises: a step in which the mobile communication terminal makes a ciphering request of the data and the voice call to the network; a step in which, when receiving the ciphering request message from the mobile communication terminal, the network transmits a ciphering authentication request message to the mobile communication terminal; a step in which the mobile communication terminal transmits a ciphering authentication response message to the network in response to the ciphering authentication request message; and a step in which the network transmits a ciphering activation completion message to the mobile communication terminal in accordance with the ciphering authentication response message transmitted from the mobile communication terminal. The ciphering authentication request message preferably includes a RAND value.

The ciphering request may be made by the mobile communication terminal even during transferring the data and the voice call between the mobile communication terminal and the network.

The ciphering request may be made by the mobile communication terminal even when the data and the voice call are not transferred between the mobile communication terminal and the network.

A method of ciphering a data and a voice call to be transferred between a mobile communication terminal and a network according to another embodiment of the present invention comprises: a step in which the mobile communication terminal transmits a ciphering request message of the data and the voice call including a specific value to the network; a step in which the network computes a key value required for a ciphering activation process on the basis of the specific value transmitted from the mobile communication terminal, and transmits a ciphering activation completion message indicative of completion of the ciphering activation process; and a step in which after the ciphering activation completion message is transmitted, the ciphering of the data and the voice call to be transferred between the mobile communication terminal and the network. Here, the specific value uses an RAND value.

A method of ciphering a data and a voice call to be transferred between a mobile communication terminal and a network according to another embodiment of the present invention comprises: a step in which the mobile communication terminal makes a ciphering request of the data and the voice call to the network; a step in which the network receives the ciphering request message from the mobile communication terminal and determines whether an RAND value is included in the received ciphering request message or not; a step in which when it is determined that the RAND value is included in the received ciphering request message, the network generates a key value (Kc) required for the ciphering using the RAND value, and then transmits a ciphering activation completion message of the data and the voice call to the mobile communication terminal; a step in which when it is determined that the RAND value is not included in the received ciphering request message, the network generates a RAND value, computes/stores an SRES value, and transmits a ciphering authentication request message to the mobile communication terminal, depending upon whether a ciphering activation should be performed or not; a step in which the mobile communication terminal transmits a ciphering authentication response message including the SRES value to the network, in response to the ciphering authentication request message transmitted from the network; and a step in which the network compares the SRES value transmitted from the mobile communication terminal with the SRES value stored in the network, and determines whether the ciphering of the data and the voice call are available or not, depending upon whether the two values are equal to each other.

The ciphering authentication request message transmitted from the network to the mobile communication terminal includes the RAND value, and the ciphering authentication response message transmitted from the mobile communication terminal to the network includes the SRES value computed by the mobile communication terminal.

The present invention further comprises a step in which when it is determined that the received ciphering request message does not include the RAND value and the ciphering activation should not be performed, the network transmits a ciphering authentication unavailable message of the data and the voice call to the mobile communication terminal.

A method of deactivating a ciphering of a data and a voice call to be transferred between a mobile communication terminal and a network according to another embodiment of the present invention comprises: a step in which the mobile communication terminal makes a ciphering deactivation request of the data and the voice call to the network; and a step in which the network performs the ciphering deactivation and transmits a ciphering deactivation completion message to the mobile communication terminal, in response to the ciphering deactivation request message transmitted from the mobile communication terminal.

The ciphering deactivation request may be made by the mobile communication terminal even during transferring the data and the voice call between the mobile communication terminal and the network.

The ciphering deactivation request may be made by the mobile communication terminal even when the data and the voice call are not transferred between the mobile communication terminal and the network.

DETAILED DESCRIPTION OF PREFERRED EMBODIMENTS

Although the embodiments of the present invention will in many cases be described as transmitting user data between a mobile communication terminal and a network, it is emphasized that the present invention is applicable to transferring other types of call information including but not limited to voice call messages transmitted by a user, SMS (Short Message Service) for transmitting short messages, SS (Supplementary Service), and PDP (Packet Data Protocol) context activation service information for transmitting GPRS packets. It is also noted that the GSM-implementation of the mobile communication system and mobile communication terminal described in the embodiments which follow is only illustrative of the present invention. The present invention is widely applicable to any type of mobile communication system and mobile communication terminal such as but not limited to a CDMA mobile communication system and terminal.

Figure 5:
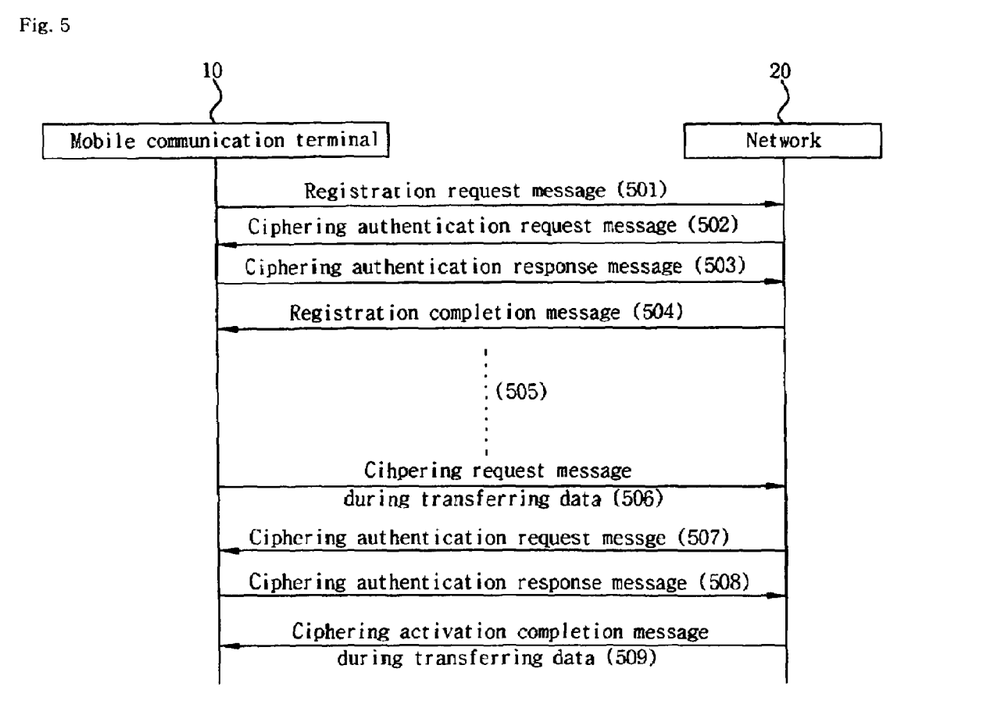
FIG. 5 is a flowchart of messages corresponding to one embodiment of a ciphering activation process performed in a mobile communication system according to the present invention.

FIG. 5 shows flow of messages in a ciphering activation process performed in a GSM mobile communication system according to one embodiment of the present invention. For illustrative purposes, some reference numerals used in FIG. 1 will be used in describing the flow of messages in FIG. 5.

When a user turns on his mobile communication terminal 10, the terminal requests registration to the network 20.

The terminal transmits a registration request message 501 to a base station 111 in the network through a wireless link, and the base station transmits a registration request message 501 to a mobile communication switching center 150 through base station controller 130.

When the registration request message 501 is received from terminal 10, the network determines whether ciphering activation should be performed. When it is determined that ciphering activation should be performed, the network transmits a ciphering authentication request message 502 to the terminal.

The terminal then transmits a ciphering authentication response message 503 to the network in response to the ciphering authentication request message 502.

After the ciphering authentication response message 503 is transmitted from the terminal, the network transmits a registration completion message 504 to the terminal indicating completion of the registration procedure. Thus, an initial process for ciphering activation between the mobile communication terminal and network is finished.

When it is determined that ciphering activation should not be preformed, the network does not transmit the ciphering authentication request message to the mobile communication terminal. Consequently, the data is normally transferred between the terminal and network without being ciphered, 505.

When the ciphering activation process between the terminal and network has not been formed in the initial registration procedure and it is required to cipher the data during transferring the data form the mobile communication terminal, the terminal transmits a ciphering request message during transferring data 506 to the network. At that time, the ciphering request message is transmitted to the network during transferring data 506 without containing a specific value (RAND: RANDom number).

When the network receives the ciphering request message during transferring data 506, the network performs the ciphering activation process.

When the network finishes the ciphering activation process, the network transmits a ciphering authentication request message 507 to the terminal.

The terminal transmits a ciphering authentication response message 508 to the network in response to the ciphering authentication request message 507.

When the ciphering authentication response message 508 is transmitted to the network, the network transmits a ciphering activation completion message during transferring data 509 indicative of completion of the ciphering activation process during transferring data to the mobile communication terminal. Thus, all the processes required for ciphering activation during transfer of the data are finished. After all the processes required for ciphering activation, all data to be transferred is ciphered and transmitted.

Figure 6:
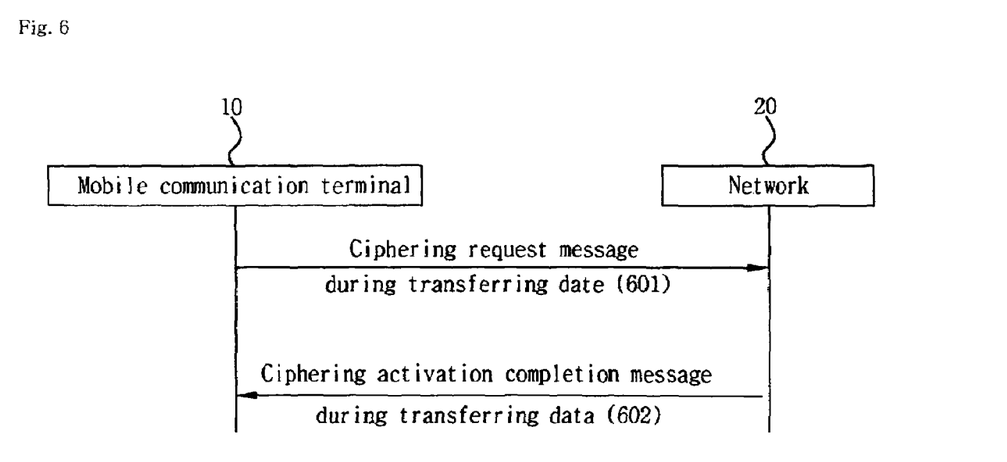
FIG. 6 is a flowchart of messages corresponding to another embodiment of a ciphering activation process which uses a specific key value according to the present invention.

FIG. 6 shows flow of messages for ciphering activation process using a specific key value in the GSM mobile communication system according to another embodiment of the present invention. This flow includes a message 601 which requests ciphering of data during transfer of data from the mobile communication terminal 10 to the network 20. This message contains a specific value (RAND: RANDom number) and is transmitted to the network 20.

The network generates a key value required for the ciphering activation process based on the specific value RAND transmitted from the terminal, and then transmits a ciphering activation completion message during transferring data 602 which indicates completion of the ciphering activation process to the terminal.

After the ciphering activation completion message is transmitted, all the data to be transferred between the terminal and network is ciphered and transmitted. Here, the time point when the terminal transmits the ciphering request message during transfer of the data can be varied. For example, the ciphering request may be made during transfer of data between the mobile communication terminal and network, and the ciphering request may be made when no data is transferred between the terminal and network.

Figure 7:
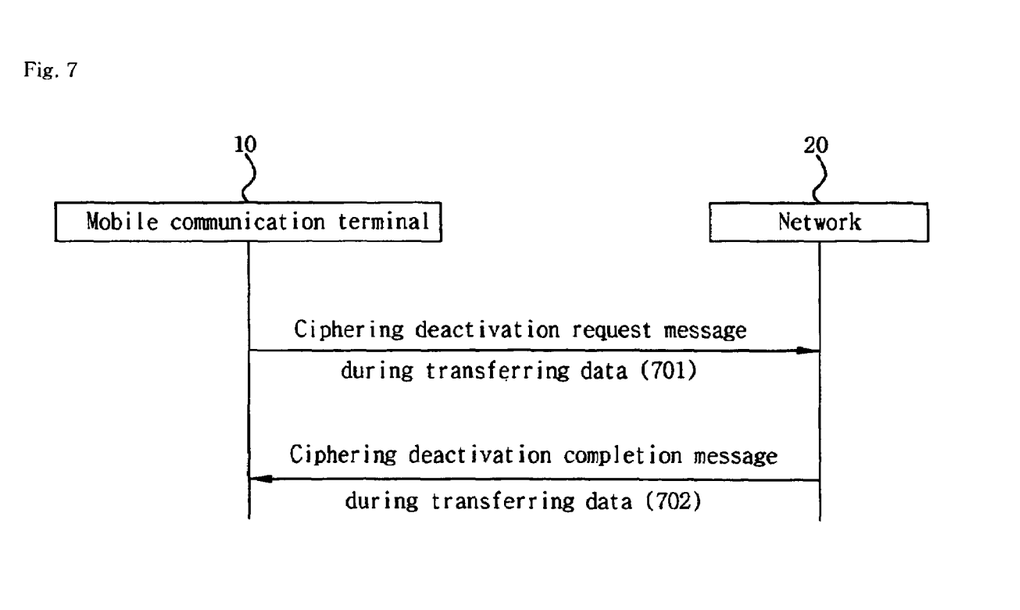
FIG. 7 is a flowchart of messages included in one embodiment of a ciphering deactivation process performed in a mobile communication system according to the present invention.

When a user does not want any more ciphering of data, even during transfer of the ciphered data between the terminal and network as shown in FIG. 7, the terminal of the user transmits a ciphering deactivation request message 701 indicating that the ciphering to the network should be stopped.

The ciphering deactivation request message transmitted to the network from the terminal is preferably included in the data to be transferred by the terminal.

When the network receives the ciphering deactivation request message 701 during transferring data from the terminal, the network transmits a ciphering deactivation completion message 702 corresponding to the ciphering deactivation request message 701 to the mobile communication terminal. As a result, the ciphering activation process is deactivated.

Figure 8:
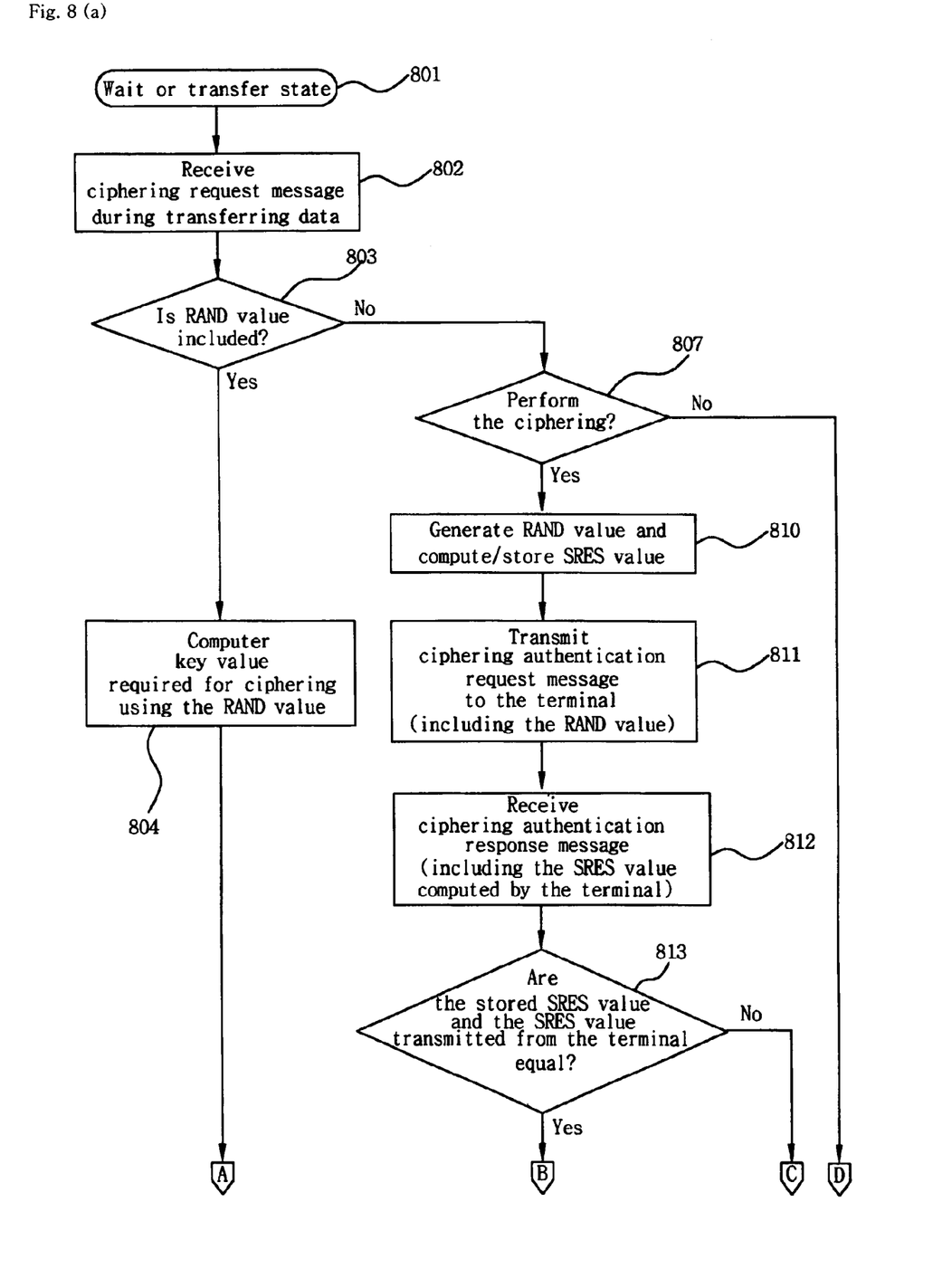
FIGS. 8(A) and 8(B) are flowcharts showing steps included in a ciphering activation process according to the present invention.
Figure 8B:
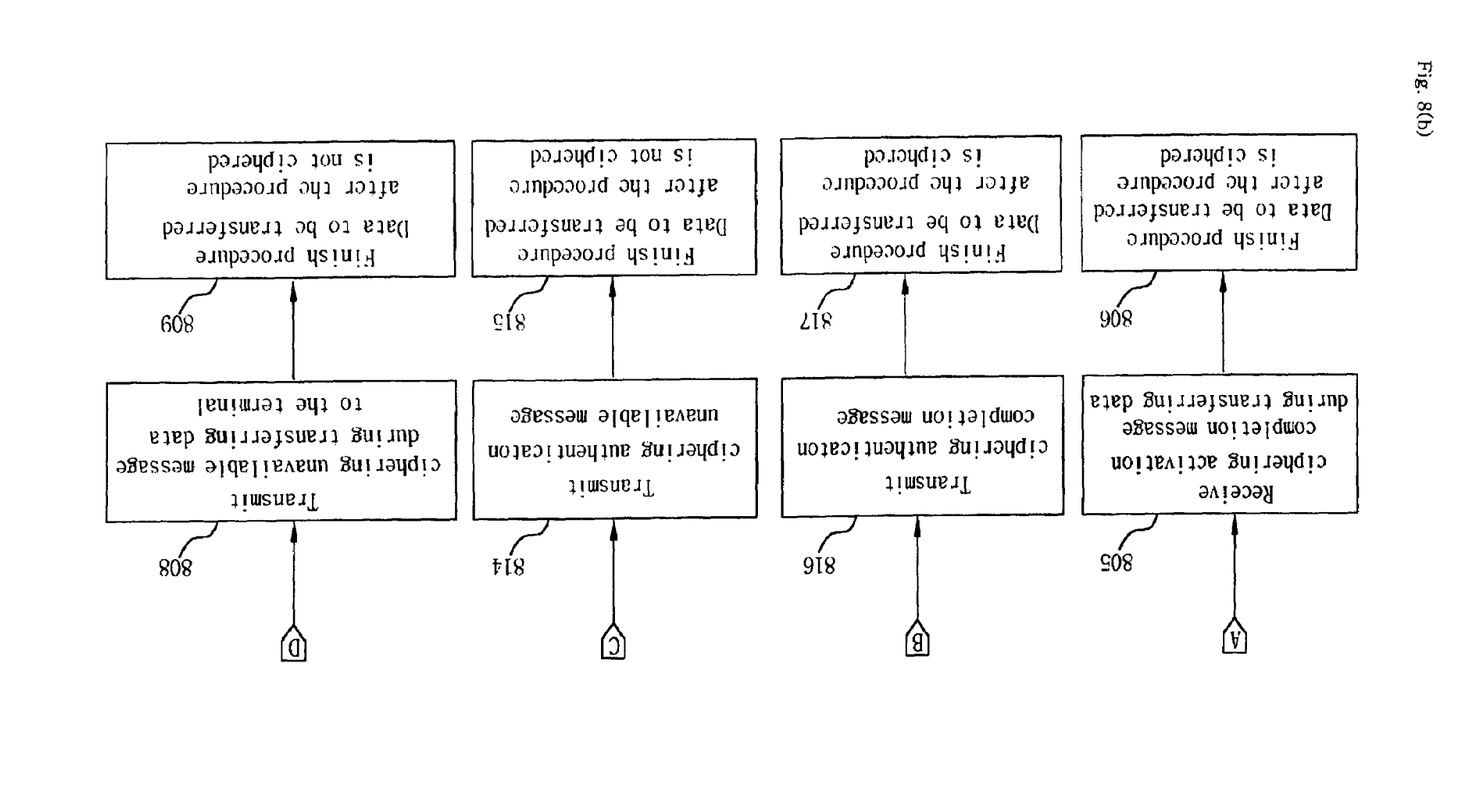

FIGS. 8(A) and 8(B) are flowcharts showing steps included in the aforementioned ciphering activation process performed in a GSM mobile communication system according to the present invention.

When in a wait state or data-transferring state 801, the network receives a ciphering request message from the GSM-type terminal, 802, the network determines whether the RAND value is included in the ciphering request message transmitted from the terminal, 803.

In the present invention, transmitting the ciphering request message from the terminal to the network during transfer of data means that the mobile communication terminal has already generated the key value (Kc) for ciphering activation based on the RAND value to be prepared for the ciphering activation. This means that the ciphering activation can be performed only if the network is prepared for ciphering activation. Therefore, in the present invention, the ciphering process of data during data transfer is carried out under the lead of the mobile communication terminal.

When it is determined, 803, that the RAND value is included in the received ciphering request message, the network computes the key value required for the ciphering activation process using the RAND value, 804, and transmits the ciphering activation completion message to the terminal. When the terminal receives the ciphering activation completion message, 805, the ciphering activation process 806 is finished, 806. After the ciphering activation process is finished, 806, all data is ciphered and then transmitted.

When it is determined, 803, that the RAND value is not included in the ciphering request message, the network determines whether ciphering should be performed for the data to be transferred, 807.

When it is determined, 807, that the ciphering should not be performed for the data to be transferred, the network transmits the ciphering unavailable message to the mobile communication terminal, 808, and the procedure is finished, 809.

After the ciphering has become unavailable, 809, all data continues to be transmitted without being ciphered.

When it is determined, in 807, that the ciphering should be performed for the data to be transferred, the network generates the RAND value, computes/stores an SRES value, and then transmits a ciphering authentication request message to the mobile communication terminal, 811. At that time, the RAND value is included in the ciphering authentication request message to be transmitted.

The terminal receives the ciphering authentication request message from the network and then transmits the ciphering authentication response message to the network. That is, the network receives the ciphering authentication response message from the terminal, 812. Here, the ciphering authentication response message includes the SRES value computed by the mobile communication terminal.

The network compares the SRES value transmitted from the mobile communication terminal with the SRES value stored in the network to determine whether the two values are equal, 813.

When it is determined, 813, that the two values are not equal, the network transmits a ciphering authentication unavailable message, indicating that ciphering data to be transferred should not be performed any more, to the mobile communication terminal, 814, and the procedure is finished, 815. After the procedure is finished, 815, the service of ciphering the data to be transferred is unavailable.

When it is determined, 815, that the two values are equal, the network transmits a ciphering authentication available message indicating the possibility of ciphering the data to be transferred to the terminal, 816, and then the procedure is finished, 817. After the procedure is finished, 817, the service of ciphering the data to be transferred is available.

As described above, according to the present invention, by improving the procedure for ciphering data in the GSM type mobile communication system, it is possible to more reliably transmit the data. In addition, since the mobile communication terminal can also determine whether the ciphering activation process should be preformed, a user can enjoy the ciphering of data or the ciphering deactivation of data, and thus the reliability of data transfer can be enhanced.

The present invention may also be implemented in the form of a computer-readable medium storing a computer program for performing any one or more of the methods described above. The computer-readable medium may be removable or permanent, magnetic or optical, or any other type of storage medium known. Examples include but are not limited to floppy disks or diskettes, compact disks, digital tape, hard disks, and digital memories. The program may be implemented in a form executable by a general-purpose processor such as a microprocessor or special-purpose processor such as an ASIC or any other type known.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of ciphering call information transferred between a mobile communication terminal and a network, comprising:

connecting a call between the terminal and the network;

transferring call information between the terminal and network without ciphering the call information;

transmitting a ciphering request from the terminal to the network after the call information has been transferred between the terminal and network without ciphering;

transmitting a ciphering authentication request message from the network to the terminal in response to the ciphering request;

transmitting a ciphering authentication response message from the terminal to the network in response to the ciphering authentication request message;

transmitting a ciphering activation completion message from the network to the terminal in accordance with the ciphering authentication response message; and ciphering additional call information to be transmitted between the terminal and network after the ciphering activation completion message is received from the network and after the call information has been transferred between the terminal and network without ciphering, wherein the ciphering request is transmitted during transfer of data from the terminal to the network during the call and after the call information has been transferred between the terminal and network without ciphering.

2. The method of claim 1, wherein the ciphering authentication request message includes a RAND value and wherein a key value is generated by the terminal based on the RAND value.

3. The method of claim 1, wherein the call information includes a voice information.

4. The method of claim 1, wherein the call information includes data and wherein the ciphering request is transmitted during transfer of data from the terminal to the network during the call.

5. The method of claim 1, wherein the ciphering request is generated and transmitted without including a RAND value for ciphering activation.

6. The method of claim 1, further comprising:

transmitting a ciphering deactivation request message from the terminal to the network during at a time when ciphered data is being transferred between the terminal and network; and deactivating ciphering in response to the ciphering deactivation request message, the ciphering being deactivated during the call.

* * * * *